(No Model.)

E. FORBES, Jr.
FAMILY FLOUR CAN.

No. 245,617. Patented Aug. 16, 1881.

Witnesses.
Henry Frankfurter
Charles G. Hutchinson

Inventor.
Elisha Forbes Jr.
per Joseph Ridge
Attorney.

N. PETERS, Photo-Lithographer, Washington, D.C.

UNITED STATES PATENT OFFICE.

ELISHA FORBES, JR., OF CHICAGO, ILLINOIS.

FAMILY FLOUR-CAN.

SPECIFICATION forming part of Letters Patent No. 245,617, dated August 16, 1881.

Application filed December 24, 1880. (No model.)

*To all whom it may concern:*

Be it known that I, ELISHA FORBES, Jr., of the city of Chicago, county of Cook, and State of Illinois, have invented a new and useful Family Flour-Can, of which the following is a full and complete description, reference being had to the accompanying drawings.

My invention principally relates to a receptacle or can for holding flour, in which or beneath which is arranged one or more sieves in such a manner as to be shaken, and also in such a manner as to be removable, in order that said sieves and receptacle may be cleaned; also, supplementary to the above, a scale for weighing flour, if desirable, may be attached, the object being convenience, cleanliness, and economy, as by the arrangement no dust or dirt can enter the receptacle, as might be the case were it necessary to uncover the top, and flying and escaping particles of flour is prevented, as would occur were the sieves exposed.

Figure 1:
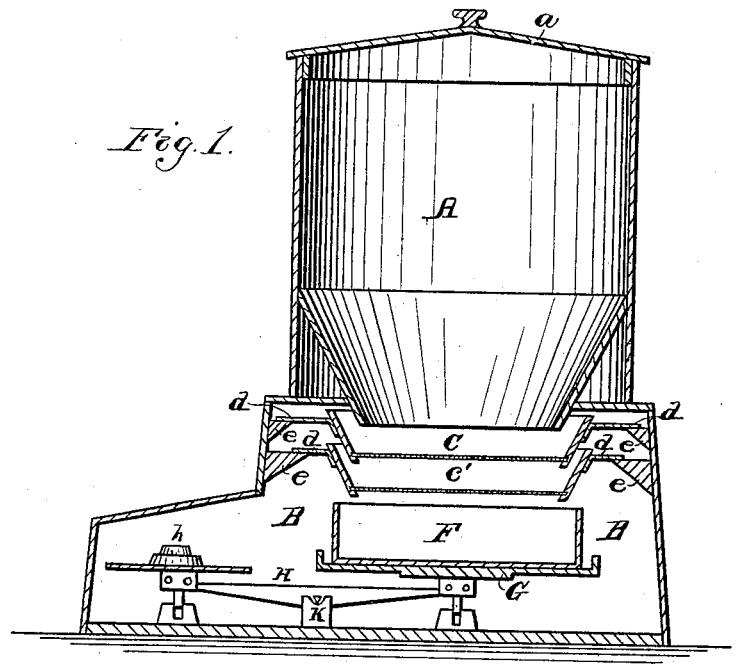
Figure 2:
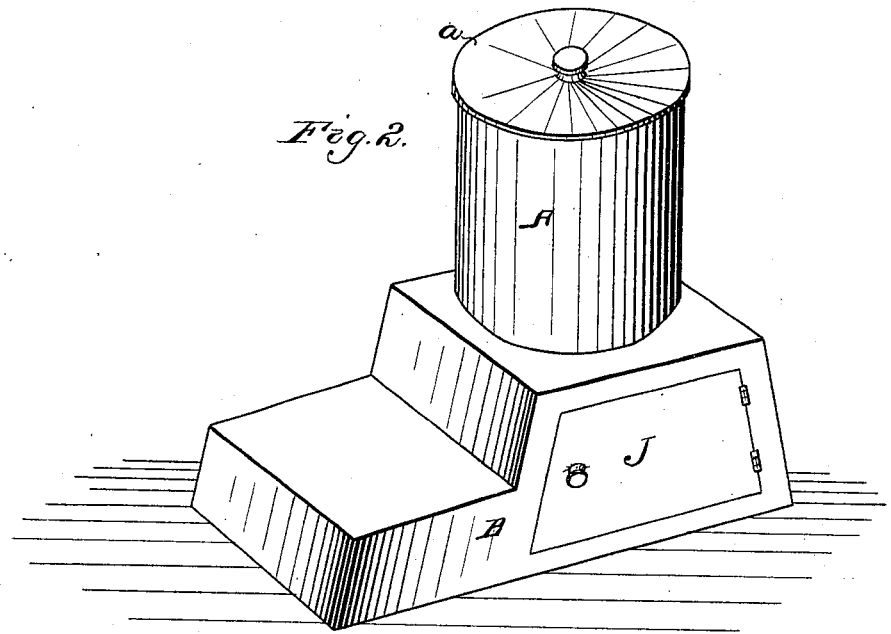

Figure 1 is a vertical section through the center of the apparatus. Fig. 2 is a perspective view.

A represents, in the present example, a cylindrical can or receptacle resting on rectangular base B, said can, having funnel-shaped receptacles, being open at the bottom and fitting in a corresponding opening in the top of base B, so as to communicate with the interior of the latter, and is provided with a cover, a.

C and C' represent sieves inserted in base B, having flaring rims, which are provided with flanges d d, that rest on ledges e e, the latter being secured to the sides of base B, by which said sieves are supported.

F represents a drawer resting on the platform of an even-balance scale, H, the beam or lever of which latter is pivoted at K, having its weight or power end projecting into a supplementary box, b, said box b having a hinged cover for giving access in applying the weights. The sieves C and C' are provided with handles projecting through the front of base B, whereby the said sieves may be manipulated for the purpose of shaking them. The shaking in the present arrangement is a back-and-forth movement, in which the flanges d d slide on the ledges e e.

Base B is provided with a door, J, giving access to its interior.

The supply of flour is emptied into and contained in receptacle A, and when cover a is on and the door of base B closed the result is a tight inclosure. The contracted bottom of receptacle A and the flaring rims of the sieves partially nest one into the other successively, so as to direct the flour in its descent into drawer F.

When it is desirable to remove a certain quantity of flour for use the proper weight is placed on the end h of the scale and the sieves shaken until a sufficient quantity of flour is deposited in drawer F, as indicated by the weight at h, when door J may be opened and said drawer F and its contents removed; thus all chance of the flour escaping during the operation of sifting is prevented.

It is desirable, in order to clean the sieves, that they be removable, as before stated, and to this end receptacle A is either hinged on base B or simply made to rest on said base and held by its own gravity, so as to be lifted off.

The lower sieve and its flanges are less in diameter than the upper, and the ledges on which it rests correspondingly broader, so as to pass the ledges upon which the upper sieve rests, thus permitting the removal of the lower as well as the upper sieve.

I do not wish to confine myself to any particular construction, nor is the scale essential to make the invention a valuable one.

A simple receptacle may be used, of any form, in which and near the bottom may be secured ledges, on which sieves shall rest, having detachable handles projecting through the wall of said receptacle with which to shake them, due regard with reference to their sizes being observed, so that the lower may be lifted out when more than one sieve is used.

The most valuable feature lies in the fact that the flour may be kept in a tight cask or receptacle, sifted, and removed without loss or dust.

By using a base, B, provided with sieve or sieves the receptacle A may be dispensed with and the flour-barrel itself be substituted. To do this it would simply be necessary to provide the top opening of base B with a flange or rim contractible or adjustable in dimension, which, by means of set-screws, or in some convenient manner, might be secured around the chine of the barrel. Then taking out the head of the barrel and securing the base B thereto in an inverted position the whole may be reversed, giving substantially the same apparatus as represented in the drawings.

Having thus fully described my said invention, what I claim, and desire to secure by Letters Patent, is—

1. Base B, provided with removable funnel-shaped sieves, in combination with the detachable receptacle A, substantially as and for the purpose set forth.

2. The receptacle A, in combination with one or more removable sieves, the base B, and scale H, substantially as described, and for the purpose specified.

ELISHA FORBES, Jr.

Witnesses:
FRANK FORBES,
CHAS. RACINE.